W. K. MARVIN.
Combination Locks.

No. 153,588.　　　　　　　　　　　　Patented July 28, 1874.

Witnesses　　　　　　　　　　　　　　Inventor.
Ewell A. Dick　　　　　　　　　　　Walker K. Marvin
W. H. King　　　　　　　　　　　　by atty A. Pollok

UNITED STATES PATENT OFFICE.

WALTER K. MARVIN, OF NEW YORK, N. Y.

IMPROVEMENT IN COMBINATION-LOCKS.

Specification forming part of Letters Patent No. 153,588, dated July 28, 1874; application filed May 13, 1874.

*To all whom it may concern:*

Be it known that I, WALTER K. MARVIN, of the city, county, and State of New York, have invented certain new and useful Improvements in Combination-Locks, of which the following is a specification:

My present invention relates to means for locking or checking the bolt-work of the safe or other receptacle to which the combination-lock is applied. This has been effected heretofore in various ways, which need not here be cited. My invention, which is designed to simplify and cheapen the construction of this portion of the lock, is characterized by operating the check or stop for the bolt-work through the back of the lock-case, and by means of the fence dog or lever.

One simple form of my invention is to combine with the dog or lever that carries the fence which falls into the notches in the disk-tumblers (when the same are brought into coincidence) a stump or pin fixed to or formed in one piece with said lever, and projecting laterally therefrom through a slot in the back of the lock-case, so as to lie normally in the path of, and to check or lock, the follower or bar connected with the bolt-work. By this simple contrivance the bolt-work can be locked in position or released at pleasure.

The nature of my invention, and the manner in which the same is or may be carried into effect, will be readily understood by reference to the accompanying drawing, in which—

Figure 1:
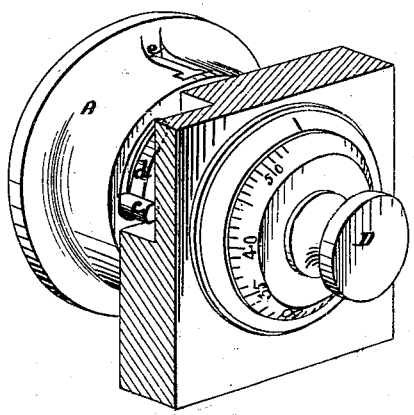
Figure 2:
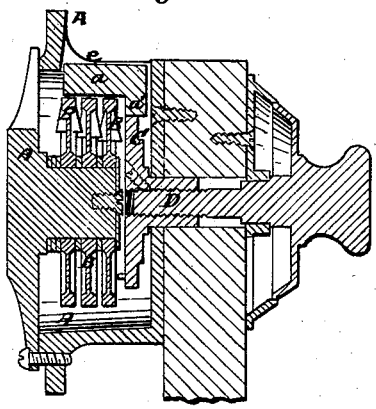
Figure 3:
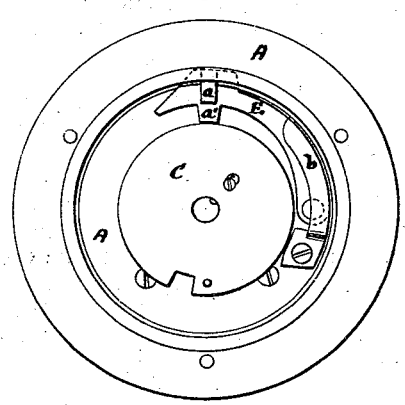
Figure 4:
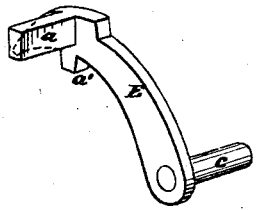

Figure 1 is a perpective view of lock made in accordance with my invention. Fig. 2 is a longitudinal central section of the same. Fig. 3 is a view of the interior of the lock-case with the tumblers removed. Fig. 4 is a perspective view of the combined dog and stump detached and removed from the bolt-case.

A is the lock-case; B, the disk-tumblers; C, the driving-wheel for operating said tumblers; D, the dial-spindle to which said driving-wheel is fixed, and by which it is operated. These parts may be of ordinary construction, and operate together in the usual way. The tumblers and driving-wheel are notched in the customary way to permit the fence carried by the dog to fall into them when they are brought into coincidence. The dog or lever is represented at E, provided with the fence $a$ and auxiliary part $a'$, constituting, in effect, a continuation of the fence, and designed to engage the notch in the driving-wheel. The dog is curved, and is located between the driving-wheel and contiguous walls of the lock-case. It rests loosely on the periphery of the driving-wheel, and is prevented from lateral displacement by the side guide or rib $b$, which holds it in position, as seen in Fig. 3. Projecting laterally from the dog is the pin or stump $c$, which extends through the back of the lock-case a sufficient distance, as seen in Fig. 1, to form a check or lock for the follower attached to the bolt-work. This follower or bar is to be so located that its rear end will, when the bolt is thrown forward, be opposite to and in contact with the pin or stump, which thus forms a bearing or check to resist the throwing back of the bolt-work. The movement of the stump, and consequently of the dog, is limited by the curved guide-slot $d$ in the lock-case. A recess or opening, $e$, in the top of the lock-case permits the dog to rise when its fence end comes opposite to or beneath said recess. Thus, supposing the tumblers to be set with their notches in coincidence and under the fence or the dog, then, if the driving-wheel be rotated to bring its notch under the part $a'$ of the dog, the dog will drop so that its fence $a\ a'$ will enter the coinciding notches of the tumblers and driving-wheel. Then, by rotating the dial-spindle D in the proper direction, the dog will be carried around with the tumblers until the stump $c$ reaches the upper end of the guide-slot $d$, in which position it will be lifted above the follower-bar of the bolt-work, which can consequently pass back beneath the said pin, and thus permit the bolt-work to be thrown back. The safe in this way can be unlocked.

In order to lock the safe the bolt-work, after the safe-door is closed, is thrown forward, which movement carries forward the follower-bar until its rear end will be in advance of and just clear of the point which the stump or pin will occupy when lowered. The dial-spindle D is then rotated in the proper direction to lower the pin, which will descend until it arrives at the lower terminus of slot $d$, where it will be just in rear of the follower-bar, and will thus constitute a check or bearing to prevent any unlocking or throwing back of the bolt-work. When the pin reaches this position the fence end of the dog will have come under the recess $e$, and a continuation of the rotation of the spindle D will, by reason of the inclined or wedge-like formation of the part $a'$, and the corresponding inclination of the sides of the notch in which it lies, cause the dog to rise, so that the fence will clear the notches in the tumblers and driving-wheel. This operation is assisted by the pin, which, taking its bearing in the lower end of the slot $d$, prevents further movement of the dog in that direction.

In an ordinary iron box, or on a door having light bolt-work, a separate handle for operating the bolt-work might be dispensed with, and the combination lock could be used to directly operate the bolt-work, by connecting the follower-bar to the stump by means of an angle or bell-crank lever, pivoted at its elbow to the door, and jointed at one end to the follower-bar, with its opposite arm slotted so as to engage the stump, and at the same time permit it to play up and down in the curved slot $d$, as before.

Figure 5:
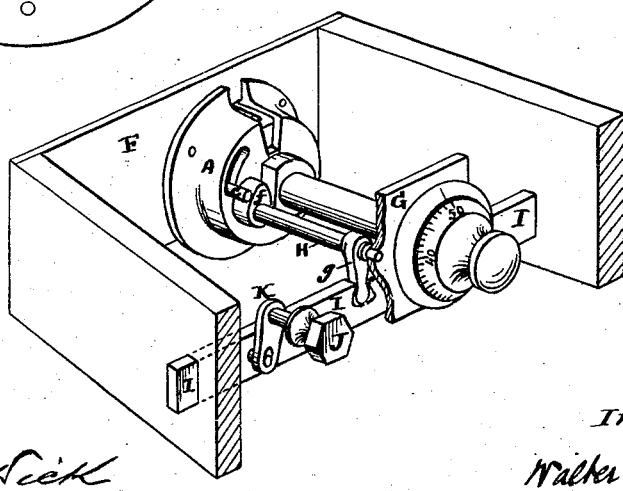

In Fig. 5 is represented still another mode of checking the bolt-work.

The plate F may represent the inner walls of the door of the safe. The outer wall G is broken away to allow the parts to be more fully disclosed. A rock-shaft, H, has its bearings at one end in the bottom of the lock-case, at the other end in the front wall G. It carries at its rear end a lug, $f$, adapted to engage the stump $c$ of the fence-dog, and at its front end a radial arm, $g$, playing with the requisite freedom in a socket in the sliding bolt I. The bolt is operated by means of a knot, J, on the front of the safe-door, provided with a crank-spindle, K, engaging a pin on the bolt in the usual way. The lug $f$, when the bolt work is thrown forward, occupies the position shown in the figure, in which position the pin or stump $c$ can come down in front it, so as to lock it securely in position to prevent the rotation of shaft H, and consequent drawing back of the bolt-work. When the stump is lifted, of course the bolt-work can be moved in either direction at pleasure.

Other arrangements for the purpose might be specified; but the above are sufficient to indicate how my invention may be carried into effect.

What I claim, and desire to secure by Letters Patent, is—

1. A combination-lock, in which the stop or check for the bolt-work is operated by means of the fence-dog or lever through the back of the lock-case, substantially as shown and described.

2. The fence-dog or lever, having a stump or pin projecting laterally therefrom through the back of the lock-case, to form a check or bearing for the bolt-work, substantially as herein shown and set forth.

In testimony whereof I have hereunto signed my name this 26th day of March, A. D. 1874.

WALTER K. MARVIN.

Witnesses:
FRED. C. BARGER,
W. B. MARVIN.